United States Patent
Areh et al.

(10) Patent No.: US 7,089,851 B2
(45) Date of Patent: Aug. 15, 2006

(54) JUICER

(75) Inventors: Marko Areh, Radlje Ob Dravi (SI); Peter Brezovnik, Mozirje (SI); Siegmund Kramer, Kirchanschöring (DE); Stanislav Mazej, Gomilsko (SI); Henrik Pavlovic, Ljubno Ob Savinji (SI); Michael Steffl, Marquartstein (DE); Igor Zibret, Smartno Ob Paki (SI)

(73) Assignee: BSH Bosch und Siemens Hausgeräte, Munich (DE)

( * ) Notice: Subject to any disclaimer, the term of this patent is extended or adjusted under 35 U.S.C. 154(b) by 0 days.

(21) Appl. No.: 10/791,531

(22) Filed: Mar. 1, 2004

(65) Prior Publication Data

US 2004/0163551 A1 Aug. 26, 2004

Related U.S. Application Data

(63) Continuation of application No. PCT/EP02/09468, filed on Aug. 23, 2002.

(30) Foreign Application Priority Data

Aug. 30, 2001 (DE) ................. 101 42 502

(51) Int. Cl.
*A47J 19/02* (2006.01)

(52) U.S. Cl. .................... 99/503; 99/486; 99/501; 99/505

(58) Field of Classification Search .................. 99/348, 99/357, 501–508, 495, 492, 485, 486, 509–513; 241/101.01, 37.5, 92, 101.2

See application file for complete search history.

(56) References Cited

U.S. PATENT DOCUMENTS

| | | | | |
|---|---|---|---|---|
| 1,509,981 A * | 9/1924 | Rice | ............................. | 99/508 |
| 1,563,413 A * | 12/1925 | Whitcomb | .................... | 99/508 |
| 1,949,675 A * | 3/1934 | Bush | ............................ | 99/507 |
| 2,003,259 A * | 5/1935 | Gilbert et al. | ................ | 99/484 |
| 2,074,708 A * | 3/1937 | Smith | ............................ | 74/75 |
| 2,176,377 A * | 10/1939 | Gamble | ........................ | 99/508 |
| 2,269,853 A * | 1/1942 | Knapp | .......................... | 99/501 |
| 2,315,018 A * | 3/1943 | Lawrence | ..................... | 99/501 |
| 4,240,338 A * | 12/1980 | McClean | ...................... | 99/501 |
| 4,309,942 A * | 1/1982 | Da Silva, Jr. | ................. | 99/501 |
| 5,193,447 A * | 3/1993 | Lucas et al. | .................. | 99/508 |
| 5,355,784 A * | 10/1994 | Franklin et al. | .............. | 99/492 |
| 5,417,152 A * | 5/1995 | Harrison | ...................... | 99/492 |
| 6,070,519 A | 6/2000 | Sham et al. | | |
| 6,363,837 B1 * | 4/2002 | Sham et al. | ................... | 99/348 |

FOREIGN PATENT DOCUMENTS

| | | |
|---|---|---|
| DE | 88 11 118.0 U1 | 12/1988 |
| EP | 0 362 058 B1 | 4/1990 |
| ES | 2 014 690 | 7/1990 |
| GB | 685987 | 1/1953 |

* cited by examiner

*Primary Examiner*—Timothy F. Simone
(74) *Attorney, Agent, or Firm*—John T. Winburn; Russell W. Warnock; Craig J. Loest

(57) ABSTRACT

A fruit juicer includes an additional switch that determines the speed at which the fruit juicer, i.e., the element that receives the fruit to be squeezed out, revolves. A button, disposed on the outer wall of the housing, actuates a microcontroller such that more power is supplied to the electric motor to make it revolve at a higher speed. The inventive fruit juicer, therefore, allows the juice to be squeezed out from the pulp already removed from the fruit.

11 Claims, 3 Drawing Sheets

JUICER

CROSS-REFERENCE TO RELATED APPLICATION

This application is a continuation, under 35 U.S.C. § 120, of copending international application No. PCT/EP2002/009468, filed Aug. 23, 2002, which designated the United States; this application also claims the priority, under 35 U.S.C. § 119, of German patent application No. 101 42 502.3, filed Aug. 30, 2001; the prior applications are herewith incorporated by reference in their entirety.

BACKGROUND OF THE INVENTION

FIELD OF THE INVENTION

The invention relates to a juicer that is driven by an electromotor and that has a central projecting element that tapers in the upward direction for pressing a piece of fruit, the juicer being drivable by the electromotor at a first rpm given actuation of a first switching device.

European Patent EP 0 362 058 B1 describes a juicer that is driven by an electromotor. There, the motor, by a drive belt and pulleys, drives a shaft at the top end of which the juicer is disposed together with an upwardly tapering element that projects from the middle thereof. The known juicer can be driven at rates of rotation between 2000 and 2500 rpm.

The activation of a known motorized juicer is realized either by the actuation of a switch by the user setting the electromotor in rotation, or by the exertion of pressure on the element by the user activating the juicer by a lever mechanism that is connected with it working in conjunction with toothed gearwheels.

SUMMARY OF THE INVENTION

It is accordingly an object of the invention to provide a juicer that overcomes the hereinafore-mentioned disadvantages of the heretofore-known devices of this general type and that makes the operating of a juicer more convenient.

With the foregoing and other objects in view, there is provided, in accordance with the invention, a juicer, including an electromotor having at least two driving speeds, a first switch connected to the electromotor, a second switch connected to the electromotor, a centrally disposed element projecting upward in a taper for pressing a piece of fruit, and the electromotor being operatively connected to the element and rotationally driving the element at a first speed upon actuation of the first switch and at a second speed greater than the first speed upon actuation of the second switch.

With the objects of the invention in view, there is also provided a juicer, including an electromotor having at least two driving speeds, a first switch connected to the electromotor and switching the electromotor to a first driving speed, a second switch connected to the electromotor and switching the electromotor to a second driving speed greater than the first driving speed, a centrally disposed element projecting upward in a taper for pressing a piece of fruit, and the electromotor being operatively connected to the element and rotationally driving the element at the first driving speed upon actuation of the first switch and at the second driving speed upon actuation of the second switch.

With the objects of the invention in view, there is also provided a juicer, including an electromotor having at least two driving speeds, a first means for switching the electromotor to a first rotational speed, a second means for switching the electromotor to a second rotational speed greater than the first rotational speed, a centrally disposed element projecting upward in a taper for pressing a piece of fruit, and the electromotor being operatively connected to the element and rotationally driving the element at the first rotational speed upon actuation of the first switching means and at the second rotational speed upon actuation of the second switching means.

A juicer according to the invention provides a second switching device with which the element can be driven at a second, higher speed.

With the aid of this function, the juice that is pressed from the fruit is centrifuged to the wall of the collecting container at a higher rate, and the fruit pulp is also thrown against the wall. As a result, juice is also squeezed from the pulp so that a larger yield of juice can be achieved with the inventive juicer.

The pressure that is automatically exerted on the element by the user when she wants to press a piece of citrus fruit simultaneously produces electrical contact and switches the motor on. When the additional switching device is, then, actuated, the rpm is increased again, for instance, to 4,000 rpm.

In accordance with another feature of the invention, the juicer is characterized by actuating the second switching device by a button.

In accordance with a further feature of the invention, it has proven advantageous when the second switching device can be actuated only if the first switching device has been actuated.

In accordance with a concomitant feature of the invention, the button is particularly easy to access when it is disposed on a jacket wall or exterior housing wall of the juicer.

Other features that are considered as characteristic for the invention are set forth in the appended claims.

Although the invention is illustrated and described herein as embodied in a juicer, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
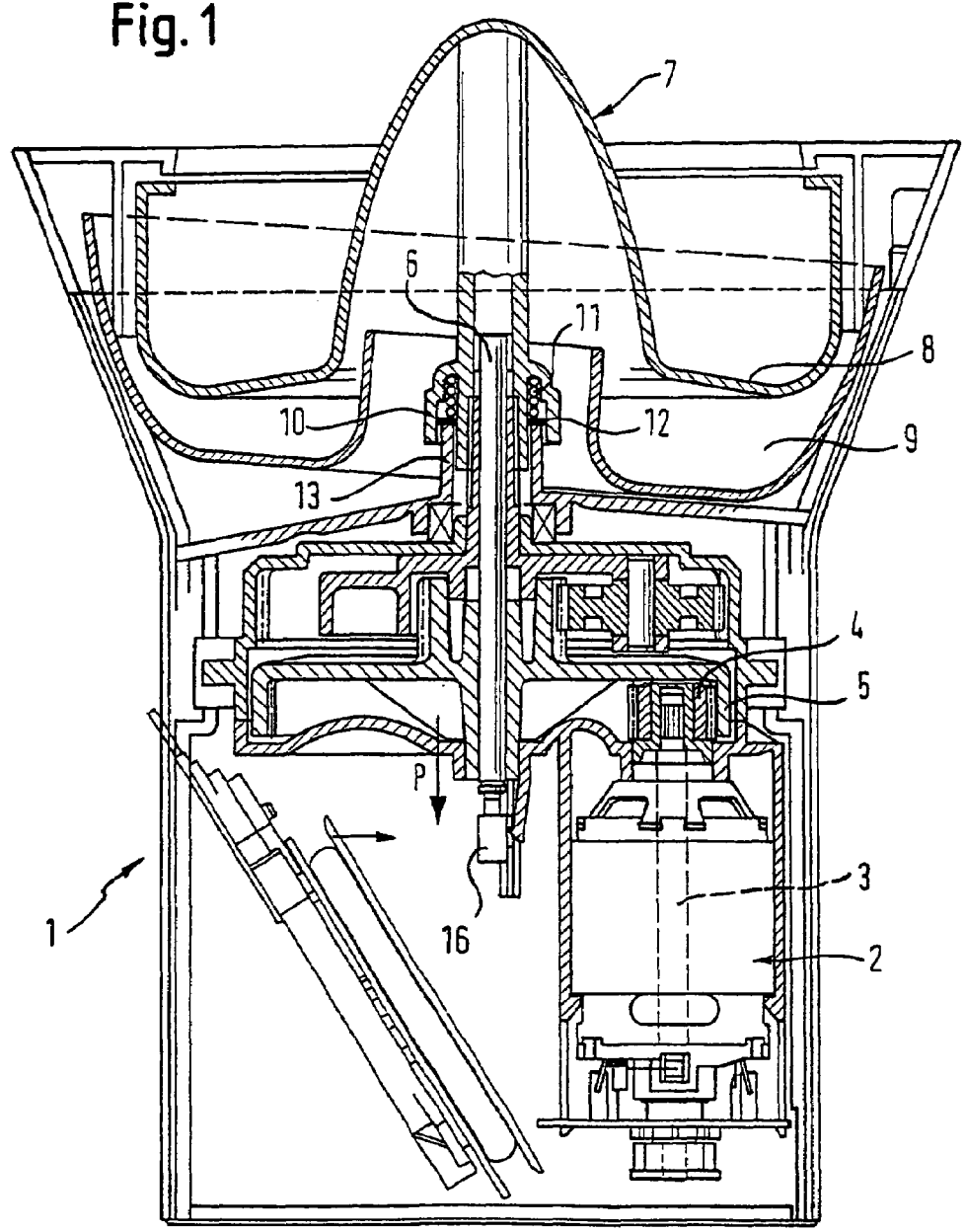
FIG. 1 is a cross-sectional view of a juicer according to the invention.

Referring now to the figures of the drawings in detail and first, particularly to FIG. 1 thereof, there is shown juicer 1 having an electromotor 2 as drive motor. This drives onto a drive shaft 3. At the end of the drive shaft 3 is a toothed gearwheel 4, which meshes with a toothed gearwheel 5.

The toothed gearwheel 5 is fastened to a drive shaft 6. At its top end, the drive shaft 6 bears an element 7 that is shaped like a rotation paraboloidal, cone, truncated cone, or hemisphere. The element 7 includes ridges with depressions in between, which serve for pressing a piece of fruit. The pressed juice runs into a collecting container 8 that surrounds the element 7 and rotates together with it by the drive shaft 8. This container includes slots from which the juice flows into a stationary bowl 9.

The underside of the element 7 is connected to a collar 10, which is fixed to the drive shaft 6. The collar 10 contacts a shaft sleeve 13 by way of a compression spring 11 and a sliding disk 12.

When a piece of fruit is placed on the element 7 to press the fruit, and force is exerted on the element 7, the element 7 is pressed down together with the collar 10 and the drive shaft 6 counter to the restoring force of the compression spring 11, whereby the drive shaft 6 is moved in the direction of arrow P.

Figure 2:
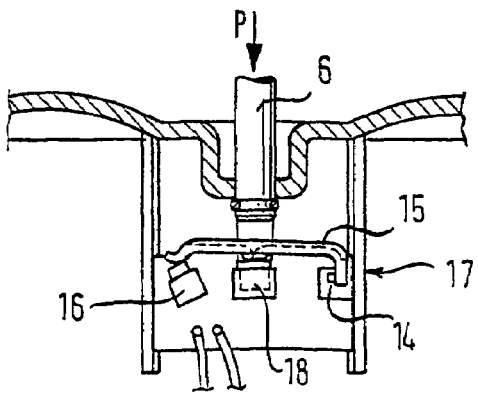
FIG. 2 is a fragmentary, enlarged, cross-sectional view of a switch of the juicer of FIG. 1.
Figure 3:
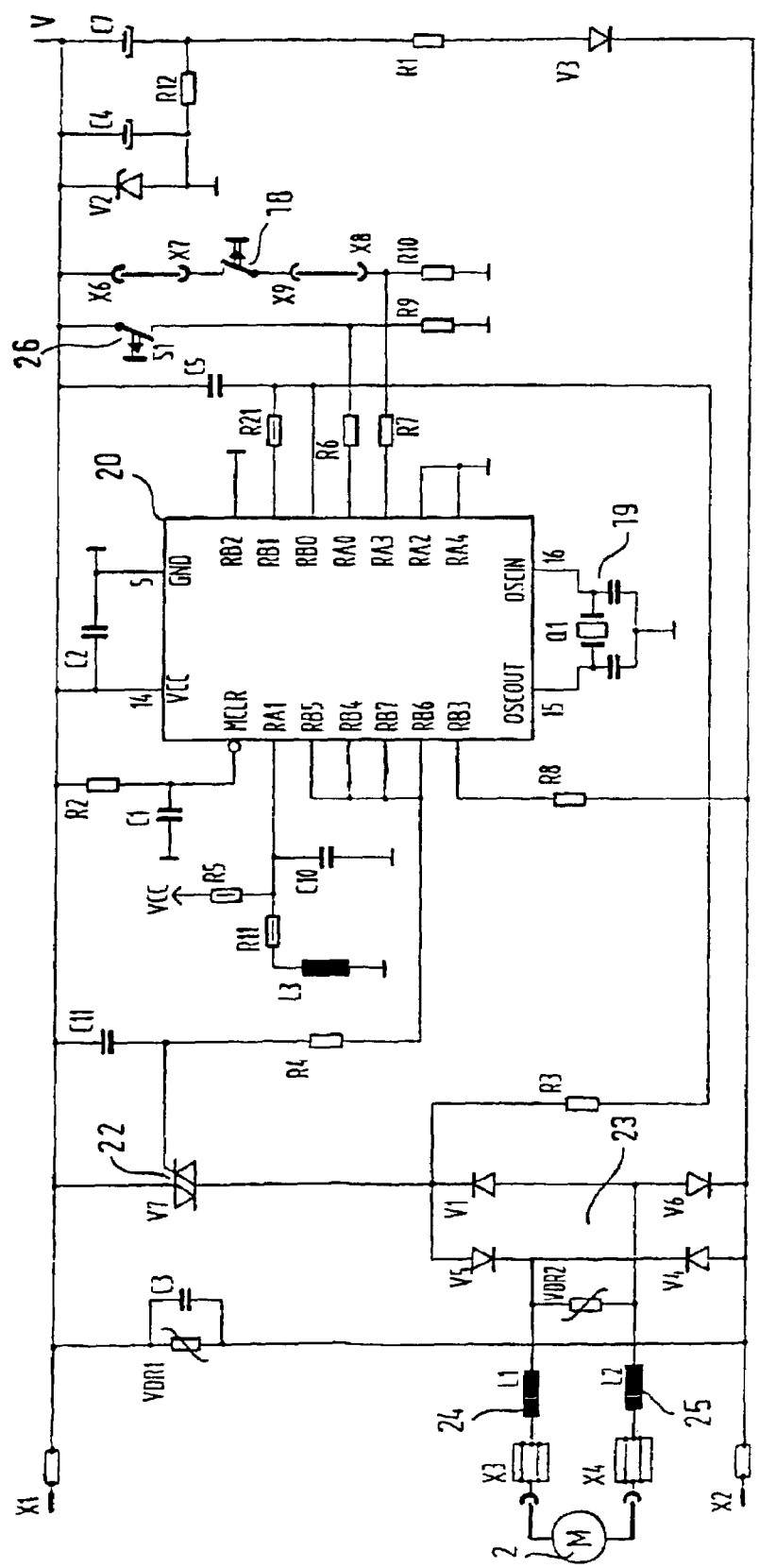
FIG. 3 is a block and schematic circuit diagram of the juicer of FIG. 1.

Based on such axial movement, the drive shaft 6 actuates a rocker switch 15 that is fastened at attachment point 14 (FIG. 2) and that can be pivoted about its free end so that the switch presses against a caliper 16. The caliper 16 is received by a housing retainer 17. With the closing of a switch contact 18 (FIG. 3) by the caliper 16, the electromotor 2 is actuated and drives the element 7 together with the collecting container 8 by the drive shafts 3, 6, the gearwheels 4, 5, and the collar 10, whereby juice is pressed from the fruit.

The electromotor 2 and the switch contact 18 are part of an electrical circuit that is supplied with a voltage V. The circuit contains a microcontroller 20 that is clocked by a clock 19 and that, by way of a control line, controls a triac 22 by which the electromotor 2 is controlled. A rectifier bridge circuit 23 is connected in series with the electromotor. Coils 24, 25 serve for signal smoothing.

Figure 4:
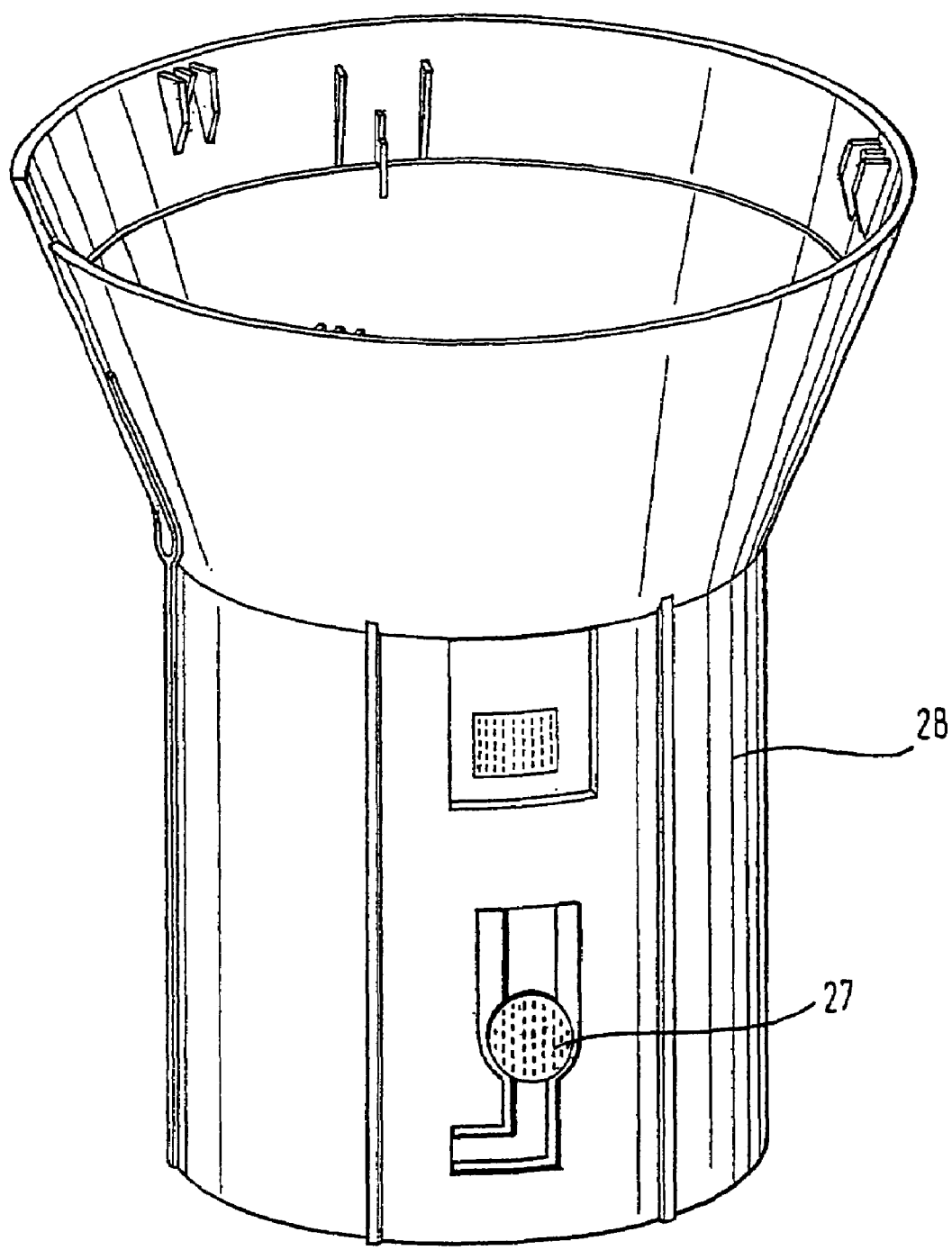
FIG. 4 is a perspective view from the side of a housing of the juicer of FIG. 1.

A switch 26 is contained in the circuit. Actuation of the switch 26 is by a button 27 (FIG. 4) that is disposed on an exterior housing wall 28 and causes a higher current to be supplied to the electromotor 2 based on a corresponding actuation by the microcontroller 20. Thus, the electromotor 2 rotates at a higher speed.

The circuit is wired either so that the switch 26 must be actuated in addition to the actuation of the switch 18, or so that either the switch 18 or the switch 26 is actuated.

According to the invention, a switch 26 is provided for causing the juicer, namely the element 7 that receives the fruit, to rotate, at a given rpm. By a button 27 disposed on the exterior housing wall 28, the microcontroller 20 is actuated to supply a higher current to the electromotor 2 and to cause it to rotate at a speed higher than the given rpm.

As such, fruit juice is pressed from pulp that has already separated from the fruit.

We claim:

1. A juicer, comprising:
   an electromotor having at least two driving speeds;
   a first switch connected to said electromotor, said first switch has an off state and an on state;
   a second switch connected to said electromotor, said second switch can be actuated only if said first switch is in said on state;
   a centrally disposed element projecting upward in a taper for pressing a piece of fruit; and
   said electromotor being operatively connected to said element and rotationally driving said element:
   at a first speed upon actuation of said first switch; and
   at a second speed greater than said first speed upon actuation of said second switch.

2. The juicer according to claim 1, further comprising a button connected to said second switch and switching said second switch upon actuation of said button.

3. The juicer according to claim 1, further comprising a button, said second switch being switchable by said button.

4. The juicer according to claim 1, wherein said second switch is a button.

5. The juicer according to claim 2, further comprising a housing wall, said button being disposed on said housing wall.

6. The juicer according to claim 3, further comprising a housing wall, said button being disposed on said housing wall.

7. The juicer according to claim 4, further comprising a housing wall, said button being disposed on said housing wall.

8. A juicer, comprising:
   an electromotor having at least two driving speeds;
   a first switch having an on state and an off state and being connected to said electromotor and switching said electromotor to a first driving speed when the first switch is in the on state;
   a second switch having an on state and an off state and being connected to said electromotor and switching said electromotor to a second driving speed greater than said first driving speed when the second switch is in the on state;
   a centrally disposed element projecting upward in a taper for pressing a piece of fruit, the element being operatively connected to the first switch and the first switch being actuated and switched to the on state when a piece of fruit is pressed on the element, the element and the first switch being biased toward the off state; and
   said electromotor being operatively connected to said element and rotationally driving said element:
   at a first speed upon actuation of said first switch; and
   at a second speed greater than said first speed upon actuation of said second switch.

9. The juicer according to claim 8, wherein said second switch can be actuated only if said first switch is in said on state.

10. The juicer according to claim 8, further comprising a button operatively connected to said second switch and switching said second switch to the on state upon actuation of said button, the button and the second switch being biased toward the off state.

11. The juicer according to claim 8, further comprising a housing wall, said button being disposed on said housing wall.

* * * * *